C. NEVIN.
SIGNAL ACTUATING DEVICE FOR VEHICLES.
APPLICATION FILED MAY 29, 1916.
1,264,545.
Patented Apr. 30, 1918.
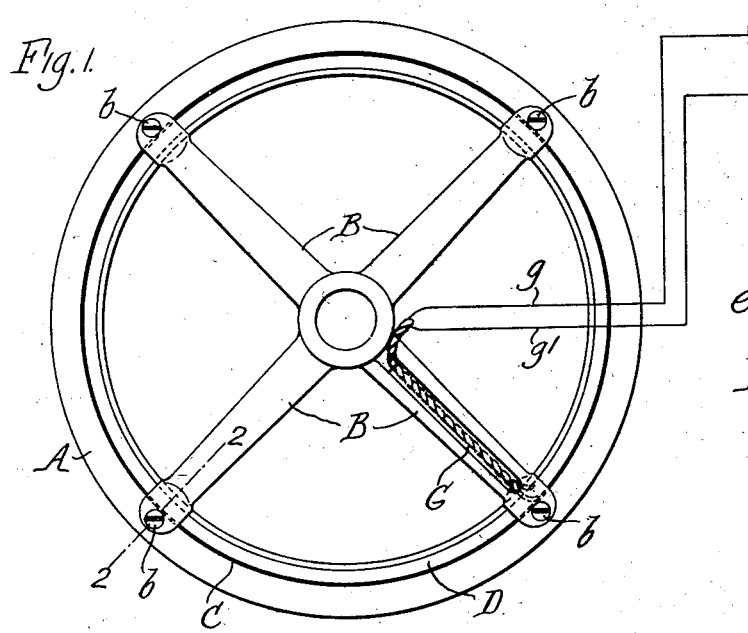
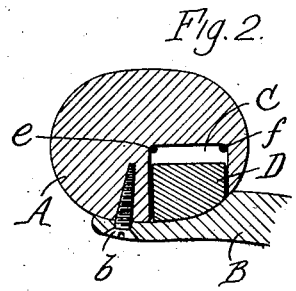
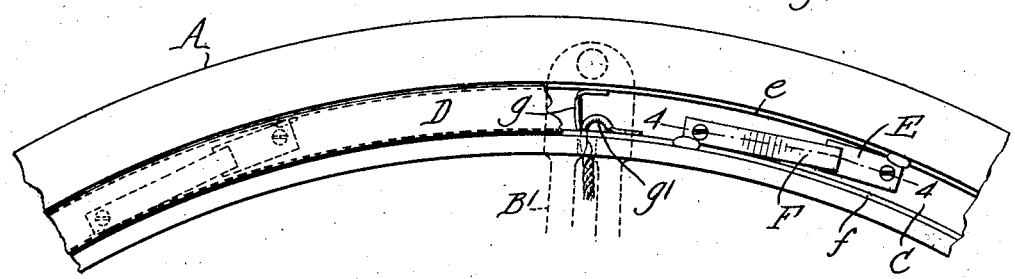
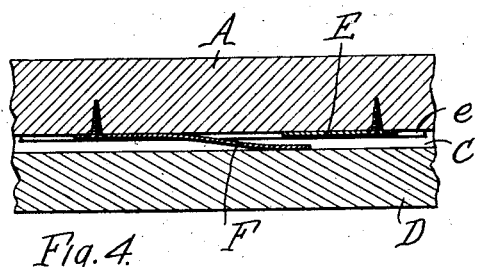
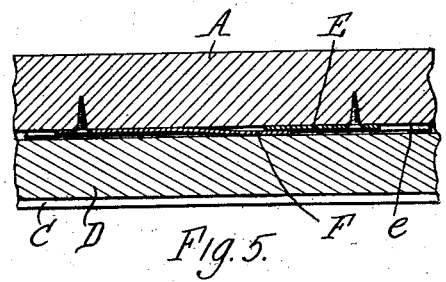
Inventor.
Charles Nevin
by Wilhelm & Parker.
Attorneys.

UNITED STATES PATENT OFFICE.

CHARLES NEVIN, OF BUFFALO, NEW YORK.

SIGNAL-ACTUATING DEVICE FOR VEHICLES.

1,264,545.  Specification of Letters Patent.  Patented Apr. 30, 1918.

Application filed May 29, 1916. Serial No. 100,440.

*To all whom it may concern:*

Be it known that I, CHARLES NEVIN, a citizen of the United States, residing at Buffalo, in the county of Erie and State of New York, have invented a new and useful Improvement in Signal-Actuating Devices for Vehicles, of which the following is a specification.

This invention relates to means arranged on the steering wheel of a motor vehicle for controlling an electric current to actuate a signal, such, for example, as an electric horn. This invention relates more particularly to devices of the kind described in my co-pending application 49,766, filed September 9, 1915, and which discloses a switch or circuit controlling device which is so arranged on the steering wheel of the vehicle that it can be actuated at any portion of the rim of the wheel without requiring the operator to remove his hand or fingers from the steering wheel or to shift his hand along the rim of the steering wheel to actuate a signal.

The objects of this invention are to simplify the construction of devices of this kind so that the movable signal actuating member of the device may be made in a single or integral piece; also to provide contact devices which in addition to opening and closing the signal actuating circuit serve also the purpose of yieldingly holding the signal actuating member of the steering wheel in its normal position; also to improve devices of this kind in other respects hereinafter specified.

In the accompanying drawings:—

Figure 1 is a bottom plan view of a steering wheel having a circuit controlling device embodying the invention mounted thereon and showing diagrammatically a signal actuating circuit.

Fig. 2 is a transverse section of the rim of the steering wheel on an enlarged scale on line 2—2, Fig. 1.

Fig. 3 is a fragmentary bottom plan view thereof showing the signal actuating member partly broken away to show a circuit closing device.

Figs. 4 and 5 are fragmentary sectional elevations thereof on line 4—4, Fig. 3, showing a circuit closing device in its open and closed positions respectively.

The steering wheel or device may be of any suitable construction, that shown comprising the usual rim A of wood or other material which is secured to spokes B of the wheel by means of screws $b$ or other suitable means.

The signal actuating device consists of a ring or signal actuating member arranged in an annular groove or slot in the rim of the steering wheel and a plurality of contact devices adapted to complete a circuit when the ring is pressed into the slot. In the construction shown C represents an annular groove or slot in the rim of the steering wheel concentric therewith and D a ring which is slidably arranged in the slot. The slot is preferably cut under the lower face of the rim of the steering wheel and the ring D is confined in the slot by means of the spokes B. By means of this arrangement rain or water will not collect in the slot or interfere with the operation of the signal actuating device and the position of the ring D is such that it is lightly grasped by the operator in steering the wheel but can be easily pushed into the slot C by exerting pressure on the ring, and this can be done without necessitating the shifting of the hands.

The circuit closing devices are arranged at intervals in the rim of the steering wheel in such a manner as to be protected from the weather or moisture and are entirely out of sight. Circuit closing devices of any suitable kind may be employed for this purpose, those shown being constructed as follows:—

Each circuit closing device comprises a stationary contact member E suitably secured in the inner portion of the slot C and a yielding or movable contact member F which is also arranged in the slot and which bears against the inner face of the ring D and normally presses the ring yieldingly into its outer or lower position. The movable contact member F is so arranged in regard to the fixed contact member that when the ring is pressed into the slot against the spring action of a movable contact member F, this member is moved into engagement with the stationary contact member to complete the signal actuating circuit. The circuit closing members are arranged at intervals in the slot C so that when any part of the ring D is pressed inwardly one or more of the movable contact members will be pressed into engagement with the corresponding fixed contact member. All of the fixed contact members E are preferably connected to a conductor e arranged in the slot C and the movable contact members are preferably connected to a conductor f also arranged in the slot C and insulated from the conductor e. The conductors are connected by means of wires or other suitable conductors g g' which are embedded in a conduit G secured on the underside of one of the spokes B where they are out of the way and inconspicuous. The conductors g g' lead from the hub portion of the steering wheel to any suitable signal actuating device, such as an electric horn H, the electricity being derived from a battery or any other suitable source of power. If desired, means independent of the circuit closing means may be employed for normally holding the signal actuating member in its lower or normal position.

By means of the construction described the signal actuating device is inconspicuous and at the same time is readily accessible so that the signal can be actuated without making it necessary for the operator or driver to shift either hand. The signal device is extremely simple and inexpensive to construct since the movable contact member F not only serves the purpose of closing the circuit when in engagement with the fixed contact member E but also acts as a spring to normally hold the ring D in a position in which the circuit closing devices are out of engagement with each other. The spokes of the steering wheel are employed for confining the signal actuating member in the slot in the wheel rim, thereby further simplifying the construction. The device described does not in any way detract from the appearance of the steering wheel, is not in the way, and considerable time can be saved in the actuation of the signal and while the signal is being actuated the driver still has use of both hands for steering the vehicle.

I claim as my invention:

1. The combination of a steering wheel having a rim provided with an annular slot, an annular movable member of substantially unitary structure in said slot, and a contact device in said slot and adapted to be connected to complete a circuit when said movable member is pressed inwardly in said slot.

2. The combination of a steering wheel having a rim provided with an annular slot, an annular movable member in said slot, and a plurality of sets of circuit closing devices arranged at intervals in said slot, at least one set of circuit closing devices being connected to complete a circuit when any part of said movable member is moved inwardly in said slot.

3. The combination of a steering wheel having a rim provided with an annular slot in one face thereof, a ring of substantially unitary structure arranged in said slot, and means in said slot for completing a circuit when said ring is moved inwardly in said slot.

4. The combination of a steering wheel having spokes and a rim provided with an annular slot in one face thereof, a ring arranged in said slot and held therein by said spokes, and means in said slot for completing a circuit when said ring is moved inwardly in said slot.

5. The combination of a steering wheel having a rim provided with an annular slot in the lower face thereof, a ring of substantially unitary structure arranged in said slot, and means in the upper portion of said slot for completing a circuit when said ring is moved upwardly in said slot.

6. The combination of a steering wheel having a rim, an annular signal actuating member arranged in immediate proximity to said rim, and a plurality of circuit closing devices arranged within said rim, and adapted to close a circuit when any portion of said annular member is pressed toward the inner portion of said rim, said circuit closing devices yieldingly opposing the movement of said annular member toward the inner portion of said rim.

7. The combination of a steering wheel having a rim, an annular signal actuating member arranged in immediate proximity to said rim, and a plurality of sets of circuit closing devices embedded in said rim, said circuit closing devices each comprising a fixed contact member secured in the rim of the wheel and a movable contact member which yieldingly opposes the movement of said annular member toward the inner portion of said rim and which is adapted to engage said fixed contact member when said annular member is pressed toward the inner portion of said rim.

8. The combination of a steering wheel having a rim provided with an annular slot, an annular movable member of substantially unitary structure in said slot, a plurality of sets of circuit closing devices arranged at intervals in said slot, at least one set of circuit closing devices being connected to complete a circuit when any part of said movable member is moved inwardly in said slot, and conductors secured in said slot and connected with said circuit closing devices.

9. The combination of a steering wheel having spokes and a rim provided with an annular slot, an annular signal actuating member in said slot, means in said slot for completing said circuit when said annular member is moved inwardly in said slot, and conductors connected with said means and forming a part of a circuit, said conductors being arranged on the underside of a spoke of said steering wheel.

10. The combination of a steering wheel having spokes and a rim provided with an annular slot in the lower side thereof, a signal actuating member arranged in said slot, circuit closing devices arranged in said slot and adapted to be connected for completing said circuit when said signal actuating member is moved inwardly in said slot, and conductors forming a part of a circuit and connected with each of said circuit closing devices, a part of said conductors being arranged on the lower face of a wheel spoke.

11. The combination of a steering wheel having spokes, and a rim provided with an annular slot, an annular circuit closing member arranged in said slot, a plurality of circuit closing devices in said slot, each of said devices comprising a fixed contact member and a movable contact member adapted to be pressed into engagement with said fixed contact member when said annular member is pressed inwardly in said slot, conductors arranged in said slot and connecting each of said circuit closing devices with a circuit, and conductors forming a part of a circuit and arranged on the lower face of a spoke.

12. The combination with the rim of a steering wheel, of a substantially annular movable member arranged in a slot in said rim and extending out of said slot in a position to be grasped by the hand of an operator driving the car, and circuit closing means arranged in said slot and actuated to close a circuit when said movable member is pressed into said slot.

Witness my hand this 25th day of May, 1916.

CHARLES NEVIN.

Witnesses:
 M. A. FISH,
 JAMES QUINN.